United States Patent

Sano

[11] Patent Number: 5,897,757
[45] Date of Patent: *Apr, 27, 1999

[54] ELECTRODE STRUCTURE FOR ELECTROLYSIS OF WATER AND A METHOD FOR STERILIZATION OF WATER THEREBY

[75] Inventor: Yoichi Sano, Zushi, Japan

[73] Assignee: First Ocean Co., Ltd., Tokyo, Japan

[*] Notice: This patent is subject to a terminal disclaimer.

[21] Appl. No.: 08/906,149

[22] Filed: Aug. 5, 1997

[30] Foreign Application Priority Data

Aug. 6, 1996 [JP] Japan ................................. 8-207146

[51] Int. Cl.⁶ ........................................................ C25B 11/00
[52] U.S. Cl. ........................................................ 204/284
[58] Field of Search ..................................... 204/283, 284

[56] References Cited

U.S. PATENT DOCUMENTS

| 4,206,030 | 6/1980 | Santora | 204/242 |
| 5,674,365 | 10/1997 | Sano | 204/283 |

FOREIGN PATENT DOCUMENTS 1143334   3/1983   Canada .
0723936   7/1996   European Pat. Off. .

OTHER PUBLICATIONS

Abstract of Japanese Laid–Open Patent Appln. Publication No. 5–33176 (Feb. 9, 1993), Database WPI, Derwent Publ., Ltd., London, GB.

Abstract of Japanese Laid–Open Patent Appln. Publication No. 2–306242 (Dec. 19, 1990), Patent Abstracts of Japan.

Primary Examiner—Bruce F. Bell
Attorney, Agent, or Firm—Sherman and Shalloway

[57] ABSTRACT

An electrode structure for electrolysis of water comprising a sheet formed from an electrically non-conductive material whose both sides are laminated with a sheet formed from an electrically conductive material, and a plurality of holes having been bored through said laminated sheet. A net shape sheet of an electrically non-conductive material or an electrically conductive material can be used as the electrically non-conductive sheet or as the electrically conductive sheet. After setting one said electrically conductive sheet as an anode and another one as a cathode, the sterilization of water by electrolysis is carried out by immersing at least a portion of the electrode structure into water, and applying an electric voltage across the anode and the cathode.

4 Claims, 6 Drawing Sheets

ELECTRODE STRUCTURE FOR ELECTROLYSIS OF WATER AND A METHOD FOR STERILIZATION OF WATER THEREBY

BACKGROUND OF THE INVENTION

This invention relates to an electrode structure which is used for the purpose to electrolyze water and aqueous solution including electrolytes, especially relates to an electrode structure for the electrolysis of water which is preferably used for the sterilization of water.

DESCRIPTION OF THE PRIOR ART

A method to produce acid and alkaline ionized water by electrolysis of water is a well-known technique. Recently, by using this technique, various methods or equipments to produce alkaline ionized water as healthy drinking water, or acid ionized water as sterilized water are proposed (Japanese patent publication 4/28439 and 4/57394, Japanese patent laid-open publication 6/47376, 6/55173 and 6/246268). Further, the methods to sterilize water by oxygen gas which generates at the electrolysis of water, or by chlorine gas or hypochlorous ion which generates at the electrolysis of the aqueous solution including chlorine salts are also proposed. And as the conventional water electrolysis, an apparatus installing a cathode and an anode and separating the two electrodes with a disposed diaphragm between the two electrodes.

OBJECT OF THE INVENTION

The object of this invention is to provide an electrode for electrolysis of water which is used for the purpose to sterilize the waste water from households, hospitals, factories and animal-breeding farms or to produce the sterilized water to be used at households, hospitals, schools and foods factories. Further the purpose of the sterilization of well water, swimming pool water, bathtub water, pond water and fish-breeding tank water can be mentioned. And also the sterilization mean of a drinking water treatment plant is one of the object of this invention.

Further, to perform a high electrolysis efficiency, it is effective to design the distance between the cathode and the anode as small as possible, and the present invention is satisfied with this important point. The object of this invention is to provide an electrode structure for electrolysis of water which can be easily applied as the mean of water sterilization and have a feature of easy processing. And another object of this invention is to provide a method for sterilization of water using said electrode structure for the electrolysis of water.

BRIEF SUMMARY OF THE INVENTION

The inventor of this invention has conduced intensive studies about the electrode structure for the electrolysis of water to accomplish the above mentioned object, and found that the water can be easily and effectively sterilized by carrying out an electrolysis reaction between a cathode and an anode which are laminated holding an electrically non-conductive material therebetween, instead of by carrying out an electrolysis between a conventional cathode and anode which are set up separately, then has accomplished the present invention.

That is, the present invention is an electrode structure for electrolysis of water (1) comprising:

a first sheet (4) formed from an electrically conductive material, a plurality of holes (6) having been formed through said first sheet;

a second sheet (2) formed from an electrically non-conductive material, a plurality of holes (3) having been formed through said second sheet; and a third sheet (5) formed from an electrically conductive material, a plurality of holes (7) having been formed through said third sheet;

said first sheet (4) and said third sheet (5) are cooperating to hold said second sheet (2) therebetween;

said first sheet (4), said second sheet (2) and said third sheet (5) are cooperating to own a plurality of holes which passes through said first sheet (4), said second sheet (2) and said third sheet (5).

Further, the present invention is the electrode structure for electrolysis of water (1), wherein the second sheet (2) formed from an electrically non-conductive material, a plurality of holes (3) having been formed through said second sheet is an electrically non-conductive material of net shape.

Furthermore, the present invention is the electrode structure for electrolysis of water (1), wherein the first sheet (4) formed from an electrically conductive material, a plurality of holes (6) having been formed through said first sheet and/or the third sheet (5) formed from an electrically conductive material, a plurality of holes (7) having been formed through said third sheet are an electrically non-conductive material of net shape.

The present invention is a method for sterilization of water by the electrolysis of water comprising:

a part or whole part of said electrode structure for electrolysis of water (1) is immersed into water;

an electric voltage is applied across the sheet (4) formed from an electrically conductive material and the sheet (5) formed from an electrically conductive material by setting one said sheet as an anode and another sheet as a cathode, or switching over mutually from an anode to a cathode.

BRIEF ILLUSTRATION OF DRAWINGS

Figure 6:
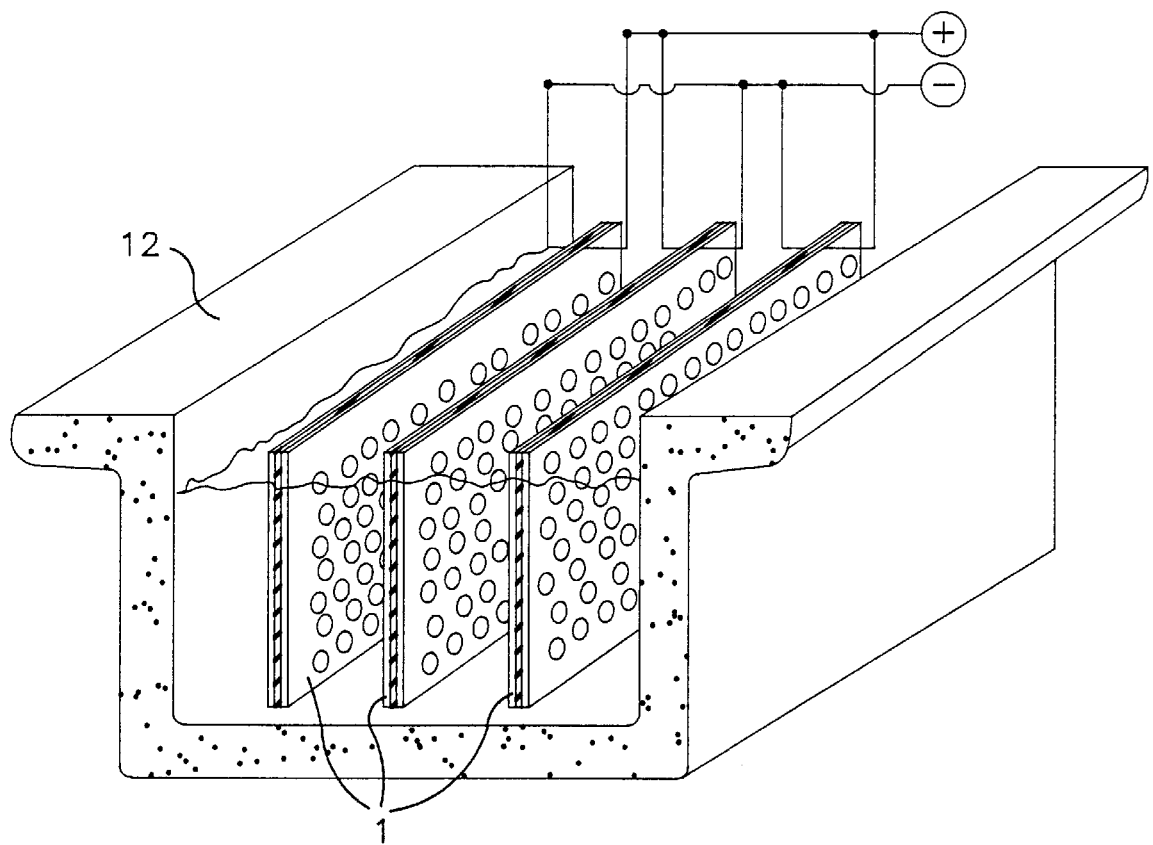

And FIG. 6 is a perspective view showing the another example of the application of the electrode structure for the electrolysis of water of this invention in a drain.

DETAILED DESCRIPTION OF THE INVENTION

In the electrolysis of water or the aqueous solution including electrolytes, when a voltage is applied across a cathode and an anode which are placed in the water or the aqueous solution including electrolytes, electrons transfer between the surface of the electrodes and electrolytically dissociated water or electrolyte. On the anode side oxygen gas is generated and hydrogen ion and hydronium ion are generated simultaneously in the water, and the water becomes acidic. In the case of aqueous solution where sodium chloride is dissolved, chlorine gas is also generated on the anode side. On the cathode side, hydrogen gas and hydroxide ion are simultaneously generated, consequently the solution becomes alkaline. Electrons which transferred from the cathode to the solution, migrate in the solution and arrive in the anode. Namely, an electric current flows from the anode to the cathode.

Above mentioned reaction which generates ions and gases are taking place closely at the surface of the anode and the cathode. Oxygen gas which is generated by the electrolysis of water, chlorine gas and hypochlorous ion which are generated by the electrolysis of the aqueous solution including chlorine salts possess a sterilization power, and can sterilize the microorganisms which are existing in water such as fungi or bacteria. The important point of the present invention is to sterilize the water or the aqueous solution using above mentioned phenomenon.

In the case of the electrolysis of the water or the aqueous solution in which small amount of electrolyte is dissolved, an electric resistance against the electric current flow from the anode to the cathode is big. To enhance the electric power effect of the electrolysis and to minimize the electric resistance, it is desirable to make the distance between a cathode and an anode as short as possible. However, in the conventional electrode structure for electrolysis of water in which a cathode and an anode are set up independently and an electrolysis is carried out at the opposite surfaces of both electrodes, it is necessary to set up the cathode and the anode with an adequate distance for the purposes to prevent the contact of the cathode and the anode, to disperse the oxygen gas, the hydrogen gas or other gas which generates at the surfaces of both electrodes and to diffuse the generated ion such as hydrogen ion, hydronium ion and hydroxide ion.

In the electrode structure for the electrolysis of water of this invention, the electrode structure has the structural features that laminating a cathode having a plurality of penetrating holes with an anode having a plurality of penetrating holes holding an electrically non-conductive material having a plurality of penetrating holes between, and having the penetrating holes through the laminate (electrode). Therefore the electrons transfer from the anode to the cathode and the ions transfers to an opposite electrode, through the fluid which exists in the penetrating holes. And also in the electrode of this invention, the distance between the cathode and the anode is equal to the sum total of thickness of sheets formed from an electrically conductive material which are used as the anode and the cathode, and a sheet formed from an electrically non-conductive material. Therefore, in comparison with the conventional electrode structure, it is possible to shorten said distance to an extreme level, and even if the electric resistance of water is high, at the electrolysis it is possible to improve the efficiency of electric power for the electrolysis. That is, the electric voltage which is necessary to apply the prescribed electric current constantly can be cut down in comparison with that of the conventional electrode structure.

Further, when an electrolysis of water is carried out using the electrode structure for the electrolysis of water of this invention, the electrolysis reaction is not carried out at the side which is faced to the sheet formed from an electrically non-conductive material (namely inner surface), because the gap formed between the anode or the cathode and the sheet formed from an electrically non-conductive material is very narrow or sealed by the adhesive resin and the amount of the aqueous solution exists in said gap is very small. On the contrary, as the large amount of the aqueous solution exists at the opposite side of the anode or the cathode (namely outer surface which is not contacted to the sheet formed from an electrically non-conductive material), the electrolysis occurs vigorously, and gases or ions which are generated at the outer side of the electrode structure are easily dispersed or diffused into the aqueous solution. Further, different from the conventional electrode structure, the anode and the cathode are not existing independently but are the laminated structure, therefore the structural intensity can be maintained by the whole composite body and also has features of easy handling, easy cutting and easy processing.

The present invention will be better understood from the following description taken in connection with the accompanying drawings, however not intended to be limited in them.

Figure 1:
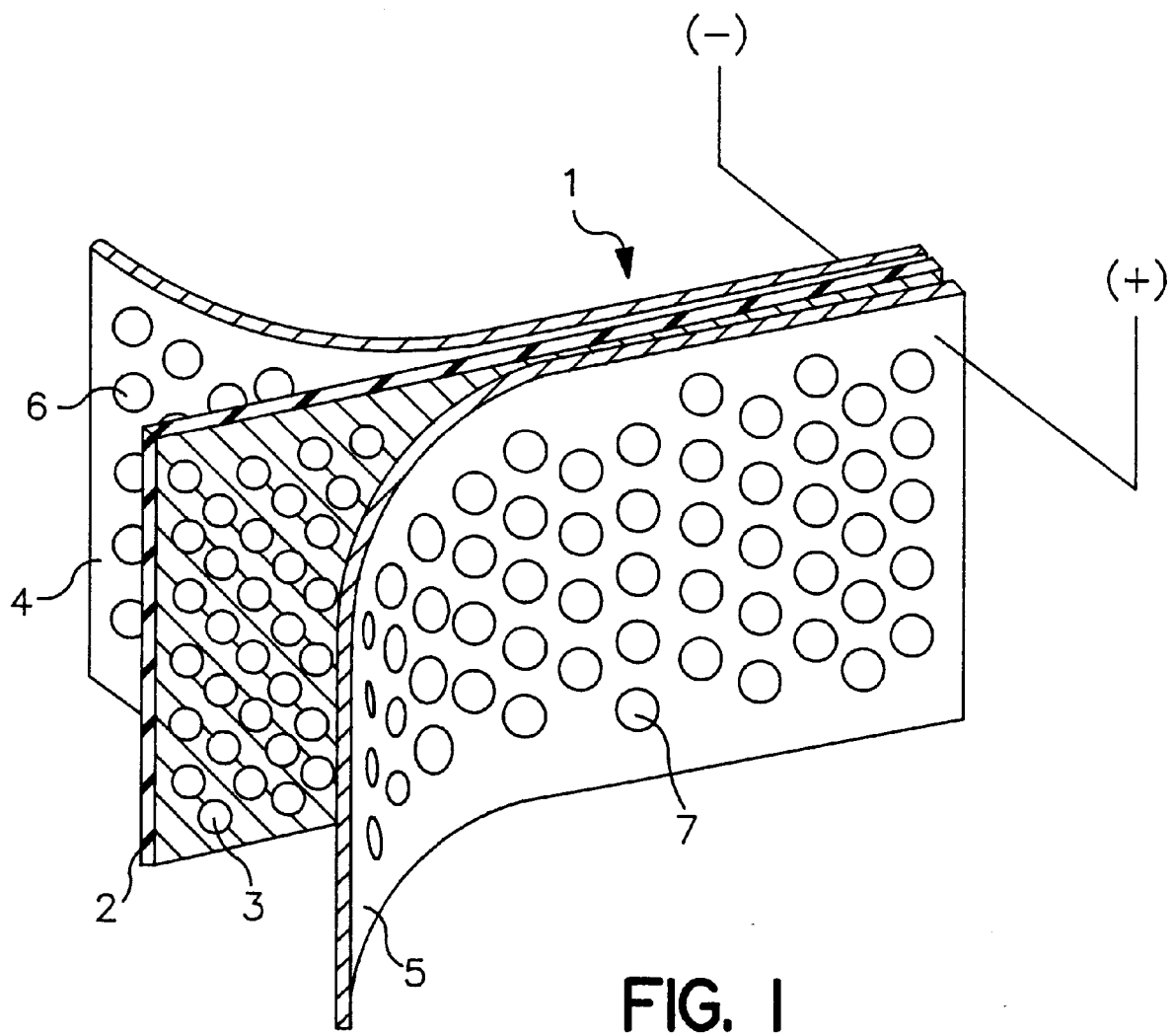
FIG. 1 is a perspective and partial exploded view showing one example of the electrode structure for the electrolysis of water of this invention.

FIG. 1 is the perspective view showing one example of the electrode structure for the electrolysis of water which is used as the mean of the sterilization of water of this invention, and in the drawing the electrode structure is partially exploded. In this example, a plurality of penetrating holes of each sheet are formed by boring. That is, this electrode structure for the electrolysis of water (1) is an electrode structure which comprises; a first sheet (4) formed from an electrically conductive material, a plurality of holes (6) having been formed through said first sheet; a second sheet (2) formed from an electrically non-conductive material, a plurality of holes (3) having been formed through said second sheet; and a third sheet (5) formed from an electrically conductive material, a plurality of holes (7) having been formed through said third sheet; said first sheet (4) and said third sheet (5) are cooperating to hold said second sheet (2) therebetween. These holes (3), (6) and (7) are formed all over the surface of the sheet materials. And when the sheet (4) formed from an electrically conductive material through which a plurality of holes (6) is bored and the sheet (5) formed from an electrically conductive material through which a plurality of holes (7) is bored are arranged and laminated to the both sides of the sheet (5) formed from an electrically non-conductive material through which a plurality of holes (3) is bored, the laminated sheet [that is electrode (1)] composing said three sheets is cooperating to own a plurality of holes which passes through said three sheets. The size, the location and the numbers of holes which passes through said three sheets are possible to be perfectly congruous or not to be congruous. When the size and the location of holes are perfectly congruous, all holes are penetrating through the cathode, anode and the electrically non-conductive sheet and does not make a passage narrow. Therefore, it has a feature of good water passing through, and the electric resistance against the electric current flow from an anode to a cathode becomes small. Therefore, it is desirable that the holes which pass through said three sheets are perfectly congruous.

The electrically non-conductive material sheet which is used in the electrode structure for the electrolysis of water in this invention is a sheet formed from a plastic which is electrically non-conductive. For instance, a sheet of polyethylene resin, polypropylene resin, polystyrene resin, polyester resin, polyvinyl-chloride resin, ABS resin, acrylic resin, epoxy resin, teflon resin, polyvinyliden-chloride resin, natural rubber, SBR rubber, silicon rubber and chloroprene rubber can be mentioned. Further, a resin board reinforced by a cloth or a net made of glass fiber, cotton or synthetic fiber can be mentioned. The thickness of the electrically non-conductive material sheet is from 0.01 to 5 mm, and the diameter of a plurality of holes bored through the electrically non-conductive material sheet is from 1 to 20 mm.

The electrically conductive material sheet which is used in the electrode structure for the electrolysis of water in this invention is a sheet formed from an electrically conductive material such as copper, lead, nickel, chrome, titanium, gold, platinum, iron oxide, stainless steel, carbon fiber or graphite board. The thickness of the electrically conductive material sheet is from 0.01 to 5 mm, and a platinum plated titanium board of 0.01–5 mm can also be used. The suitable diameter of a plurality of holes bored through the electrically non-conductive material sheet is from 1 to 20 mm.

For the fabrication of the electrode structure for the electrolysis of water of this invention indicated in FIG. 1, the following procedure is preferably used. Namely, an electrically conductive material sheet (4) through which a plurality of holes (6) is bored, an electrically non-conductive material sheet (2) through which a plurality of holes (3) is bored and an electrically conductive material sheet (5) through which a plurality of holes (7) is bored are previously prepare. These three sheets are arranged together cooperating to own a plurality of holes which passes through said three sheets and laminated by adhering whole part or partial part of contact surface of each material sheet. Further, the procedure comprises, laminating an electrically conductive material sheet without holes to the both sides of an electrically non-conductive material sheet without holes by adhering whole part or partial part of contact surface of each material sheet, and a plurality of holes is bored through the laminated sheet, can be mentioned. Furthermore, the following procedure can be also mentioned. That is, after electrically conductive materials such as platinum is plated over the whole surface of electrically non-conductive material sheet, then a plurality of holes is bored through the plated sheet.

Figure 2:
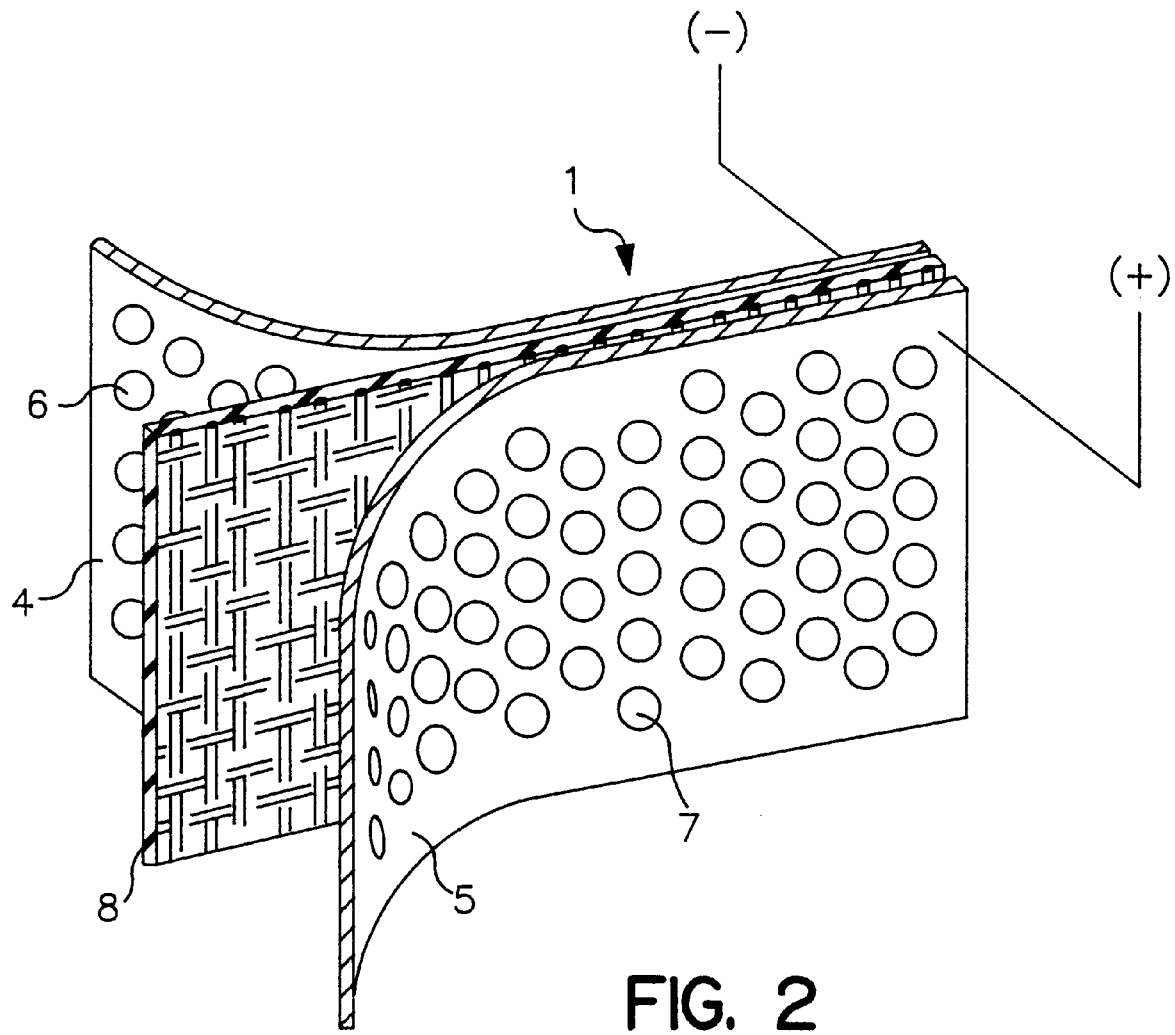
FIG. 2 is a perspective and partial exploded view showing another example of the electrode structure for the electrolysis of water of this invention.

FIG. 2 is a perspective and partial exploded view showing one example of the electrode structure for the electrolysis of water of this invention (1), in which an electrically non-conductive material sheet of net shape (8) is used instead of an electrically non-conductive material sheet (2) through which a plurality of holes (3) is bored. Said net shape electrically non-conductive material sheet (8) is a net shape substance formed from or covered by an electrically non-conductive material such as polyethylene resin, polypropylene resin, polystyrene resin, polyethylene-trephthalate resin, polyvinyl-chloride resin, ABS resin, acrylic resin, epoxy resin, teflon resin, polyvinyliden-chloride resin, natural rubber, SBR rubber, silicon rubber, chloroprene rubber, glass fiber and cotton, and both knitted net and woven net can be used. And the preferable pore opening of the net is from 180 to 2 mesh.

The electrode for the electrolysis of water of this invention (1) shown in FIG. 2 can be fabricated by following procedure. Namely, an electrically conductive material sheet (4) through which a plurality of holes (6) is bored, an electrically non-conductive material sheet of net shape (8) and an electrically conductive material sheet (5) through which a plurality of holes (7) is bored are arranged together cooperating to own a plurality of holes which passes through said three sheets and laminated by adhering whole part or partial part of contact surface of each material sheet.

Figure 3:
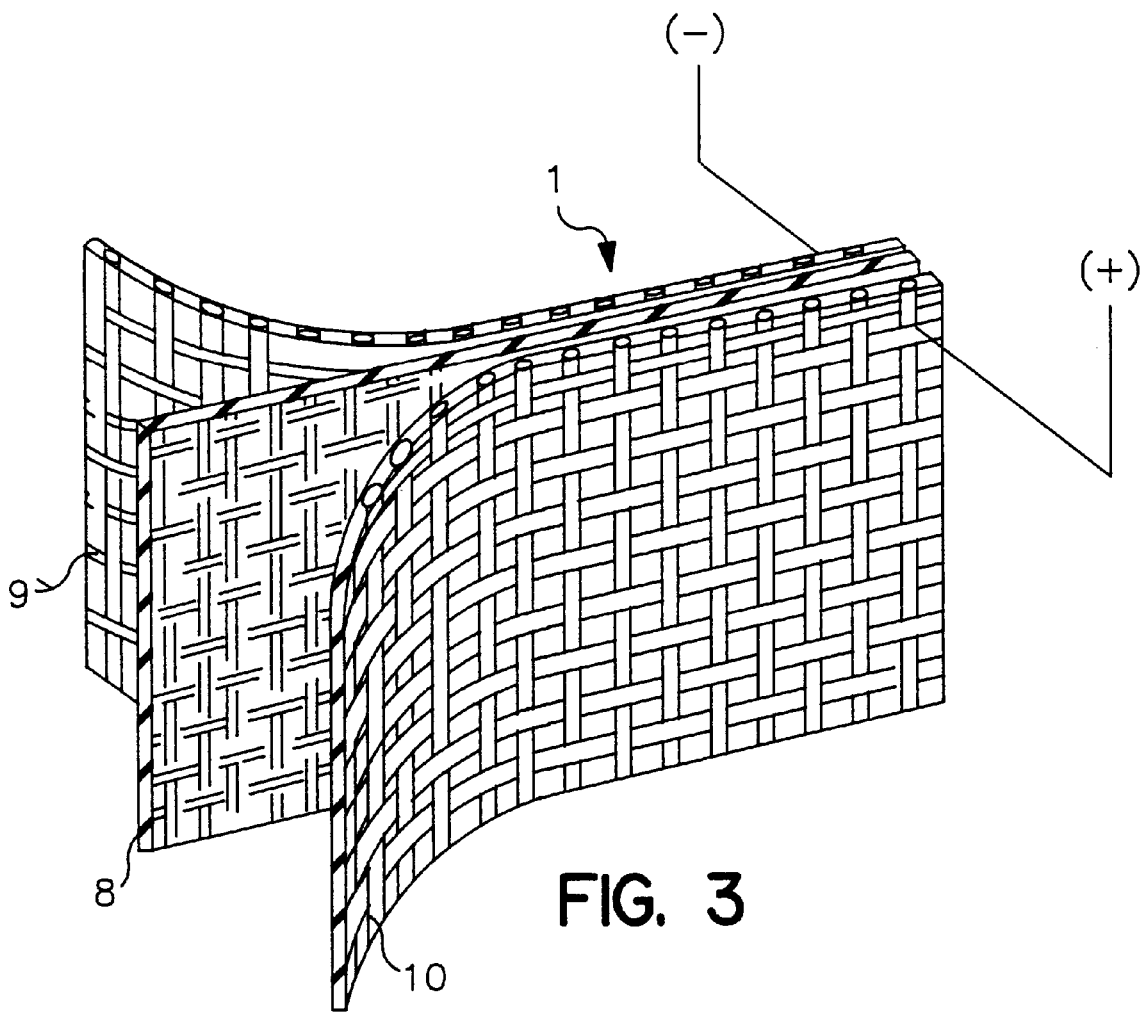
FIG. 3 is a perspective and pertial exploded view showing another example of the electrode structure for the electrolysis of water of this invention.

FIG. 3 is a perspective and partial exploded view showing the electrode structure for the electrolysis of water of this invention, in which the both sides of an electrically non-conductive material sheet of net shape are laminated with an electrically conductive material sheet of net shape. As the electrically conductive material sheet of net shape (8), same sheet to that of FIG. 2 is used. And as the net shape electrically conductive material (9) and the net shape electrically conductive material (10), a knitted or woven net of an electrically conductive fiber such as copper, lead, nickel, chrome, titanium, gold, platinum, iron oxide, stainless steel, carbon fiber board or graphite board can be used. And the preferable pore opening of the net is from 10 to 1 mesh.

The electrode structure for the electrolysis of water of this invention (1) shown in FIG. 3 can be fabricated by following procedure. Namely, a net of electrically conductive material (9), a net of electrically non-conductive material (8) and a net of electrically conductive material (10) are arranged together and laminated by adhering whole part or partial part of contact surface of each material sheet. Further, in the electrode for the electrolysis of water of this invention shown in FIG. 3, either the net of electrically conductive material (9) or the net of electrically conductive material (10) can be replaced by an electrically conductive material sheet through which a plurality of holes is bored.

Figure 4:
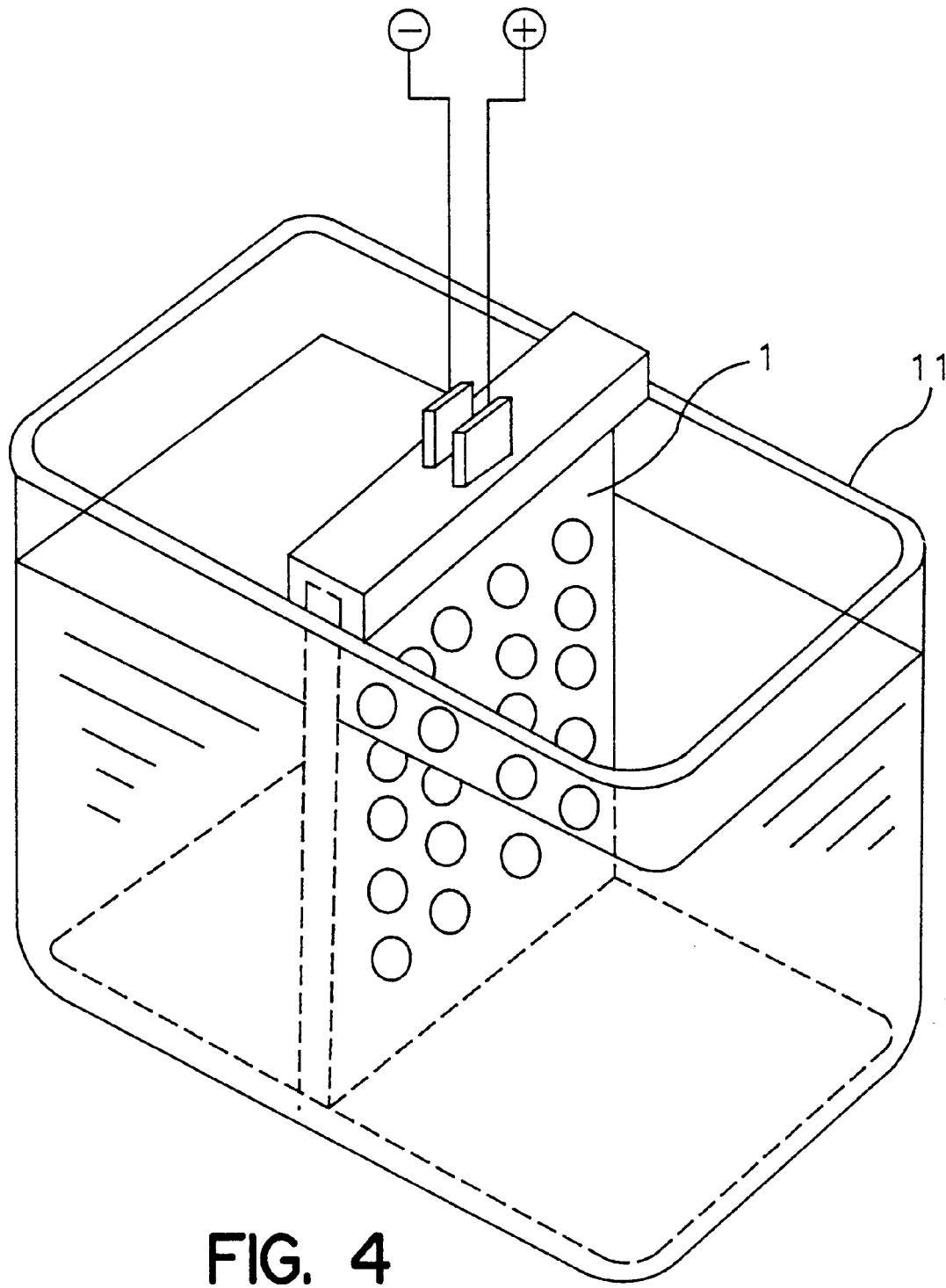
FIG. 4 is a perspective view showing the application of the electrode structure for the electrolysis of water of this invention in a water tank.

Secondly, the method of the sterilization of water using the electrode structure for the electrolysis of water fabricated by above mentioned procedure is illustrated. FIG. 4 is a perspective view which illustrates the method of sterilization by containing water or aqueous solution to be sterilized into a water tank. The electrode structure for the electrolysis of water (1) indicated in FIG. 1 is put into the water tank (11). Then, after one electrically conductive material sheet (4) is set up as an anode and another electrically conductive material sheet (5) is set up as a cathode, electric voltage is applied. Electrons transfer between the electrically conductive material sheet (4) and the electrically conductive material sheet (5) through the hole (3), electric current flows from the anode to the cathode and the electrolysis is carried out. At this time, at the anode side, hydric ion and oxygen gas are generated. If chloride component is contained in solution, chlorine gas is generated at the anode. At the cathode side, hydroxide ion and hydrogen gas are generated. These generated oxygen gas, chlorine gas or hypochlorite ion which is generated by the reaction of chlorine with hydric ion, have a sterilizing function in water. In the water tank, the plural number of the electrode structure for the electrolysis of water (1) can be put into. The electrode structure for the electrolysis of water (1) which is processed to have a corrugate shape or a cylindrical shape can be used. These types have an effect to increase an surface area to contact with water, and accordingly a sterilizing effect can be improved.

By this electrolysis, at the anode side hydric ion and hydronium ion generate as well as the generation of oxygen gas, and the solution surrounding the anode indicates acidity. On the contrary, at the cathode side hydroxide ion generates as well as the generation of hydrogen gas, and the solution surrounding the cathode indicates alkaline. In a case of a regular electrolysis, a diaphragm is disposed to protect a mixing of said acidity solution and alkaline solution, however since the object of this invention is to sterilize the solution by the generated oxygen gas, chlorine gas and hypochlorite ion, it is not necessary to arrange a diaphragm. To obtain oxygen gas or hydrogen gas or to obtain a acidity solution or an alkaline solution is not the object of this invention. Further, the above mentioned acidity solution which exists instantaneously has also a sterilizing function. Furthermore, the sterilization by the contact of a microorganism with the electrode is also effective.

Figure 5:
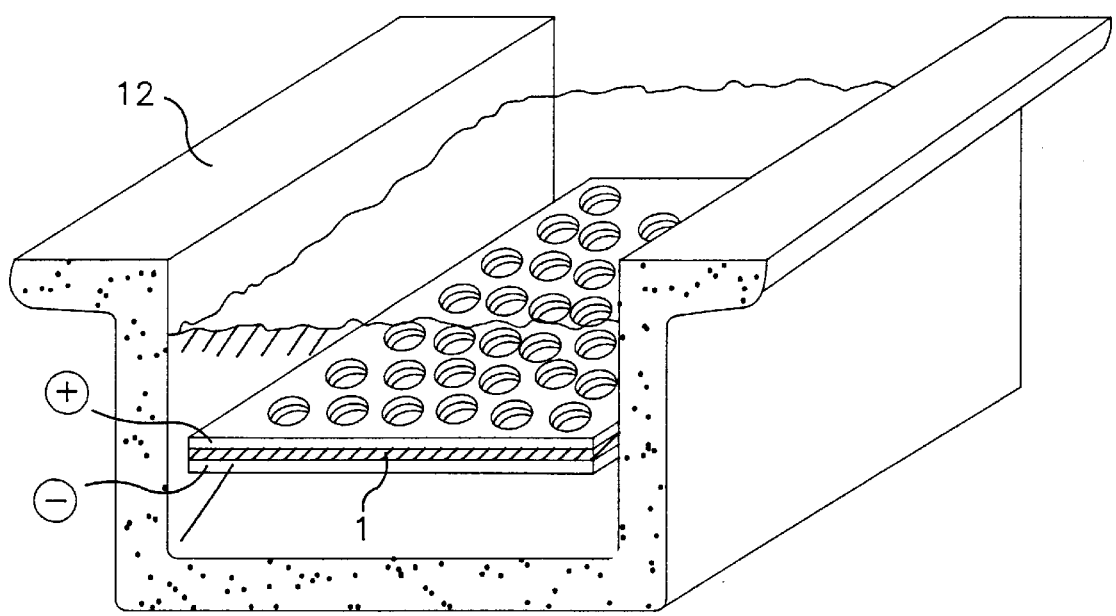
FIG. 5 is a perspective view showing the application of the electrode for electrolysis of water of this invention in a drain.

The electrode structure for the electrolysis of water of this invention can be used for the sterilization of the flowing water. Namely, for instance, the electrode structure for the electrolysis of water of this invention is set up in a tube or in a drain, water or aqueous solution is poured into the tube or the drain, then by applying electric voltage to the electrodes the sterilization is carried out. FIG. 5 and FIG. 6 show the embodiment of the sterilizing method of a drain by using the electrode for the electrolysis of water. FIG. 5 is an embodiment that the electrode structure for the electrolysis of water (1) of this invention is set up parallel with the bed of a drain (12), and in the drawing only one electrode is set up, however plural electrodes can be set up. FIG. 6 shows an embodiment that the electrode structure for the electrolysis of water (1) of this invention is set up parallel with the side wall of a drain (12). In these embodiments, the width of the drain is 50 cm and the height is 40 cm. The width of the electrode structure for the electrolysis of water (1) is 45 cm and the length of it is 120 cm. Electric current of 20 ampere is applied by 30 volt. electric voltage. The electrode structure (1) which is processed to have a corrugate shape or a cylindrical shape can be used. These types have an effect to increase an surface area to contact with water and accordingly a sterilizing effect can be improved.

As the electric source to be applied to the electrode structure of this invention, a direct current is generally used, however an alternating current can be also used. The sterilization system of this invention can be used as the sterilization of the drainage from homes, hospitals and factories or as the preparation of the sterilized water used in hospitals or food factories. And also can be used as the sterilization of circulating warm water of the bath.

EXAMPLES

The present invention is further illustrated by following Examples.

Example 1

An electrically non-conductive polyethylene film of 0.3 mm thickness is hold between two titanium plate of 1 mm thickness on one surface of which platinum is plated, and laminated by heat press. These titanium plates are arranged to expose the platinum plated surface to the outer side. A plurality of holes having 7 mm diameter is bored through the laminated plate by 10 mm pitch, and prepared the electrode structure of this invention. The opening ratio of holes is 43.4%. The electrode is cut off to a rectangular sheet of 100 mm×220 mm, and rounded to a cylindrical shape. Said cylindrical electrode structure is set up in a beaker of 1 liter capacity, and 900 milli liter of water to be sterilized is filled up in the beaker. Then, after one titanium plate is set up as an anode and another titanium plate is set up as a cathode, direct electric current is applied at lower electron voltage. The existence of microorganism is investigated before and after the electrolysis.

The water including microorganism is prepared, and 10 ppm of NaCl is added to said water. Both said two kinds of water are treated by electrolysis for 30 minutes and 120 minutes, and the existence of microorganism in these kinds of water are investigated before and after the electrolysis. The measuring method of microorganism is carried out as follows. That is, each specimen from these kinds of water is inoculated on a modified BHI medium and modified DHL medium of investigating food plate for general bacillus and *escherichia coli*, and cultivated for three days at room temperature, then the number of colony is counted. If the numbers of colony are small, the numbers of microorganism in water are small.

As an original water including microorganism, water contained in a goldfish-breeding tank is used. After five goldfishes of about 5 cm size are bred in a fish-breeding tank of 10 liter capacity for one week, and the top water is used as the original water.

The results are summarized in Table 1. It is obvious from table 1 that the sterilization effect using the electrode structure for the electrolysis of water of this invention is excellent.

TABLE 1

| | | numbers of colony | |
| --- | --- | --- | --- |
| | electrolysis period | modified BHI medium | modified DHL medium |
| original water | 0 | 150 | 15 |
| | 30 minutes | 1 | 0 |
| | 120 minutes | 0 | 0 |
| 100 ppm Nacl added | 10 minutes | 0 | 2 |
| to original water | 30 minutes | 3 | 0 |

Example 2

Urine is diluted by the city water to four times. 1000 cc of the diluted urine is treated by the electrolysis using the cylindrical electrode which is set up in a beaker of 1 liter capacity like as Example 1. Electric voltage of 3.7–4.0 volt is applied to the electrode structure and the diluted urine is treated by 830 mA electric current for 7 hours. Consequently, the color of the fluid turned from light yellow to coffee color. The existence of microorganism in the fluid is investigated before and after the electrolysis like as Example 1. The results are summarized in Table 2.

TABLE 2

| | | numbers of colony | |
| --- | --- | --- | --- |
| | electrolysis period | modified BHI medium | modified DHL medium |
| diluted urine | 0 | 0 | all-out black |
| | 7 hours | 0 | 0 |

Because the oxygen gas, the chlorine gas or the hypochlorous ions which are generated by the electrolysis of water or the aqueous solution including chlorine electrolyte using the electrode for the electrolysis of water of this invention have a sterilization effect, the sterilization treatment for water or the aqueous solution including chlorine electrolyte can be carried out by the electrolysis using the electrode of this invention. And, since the electrode structure for the electrolysis of water of this invention is very simple. The said electrode structure comprises a sheet formed from an electrically non-conductive material whose both sides are laminated with a sheet formed from an electrically conductive material, and a plurality of holes having been bored through said laminated sheet, or comprises a net shape sheet formed from an electrically non-conductive material whose both sides are laminated with an net shape sheet formed from an electrically conductive material. Therefore, it can be prepared without difficulty. Further, the electrode structure of this invention has advantages to be easily cut off and formed.

When a voltage is applied across the sheets formed from an electrically conductive material which are laminated to both sides of a sheet formed from an electrically non-conductive material by setting one sheet as an anode and another sheet as an cathode and the electrolysis is carried out, since said two sheets are only holding the sheet formed from an electrically non-conductive material, the distance between the anode and the cathode is very small and the electric efficiency is very high. Therefore, the electrode structure for the electrolysis of water of this invention can be preferably used as a means for sterilization of the drain from homes, hospitals and factories and as an apparatus for the preparation of sterilized water to be used in hospitals or food factories.

What is claim:

1. An electrode structure for electrolysis of water (1) comprising:

a first sheet (4) formed from an electrically conductive material, a plurality of holes (6) having been formed through said first sheet;

a second sheet (2) formed from an electrically non-conductive material, a plurality of holes (3) having been formed through said second sheet; and a third sheet (5) formed from an electrically conductive material, a plurality of holes (7) having been formed through said third sheet;

said first sheet (4) and said third sheet (5) are cooperating to hold said second sheet (2) therebetween;

said first sheet (4), said second sheet (2) and said third sheet (5) are cooperating to own a plurality of holes which passes through said first sheet (4), said second sheet (2) and said third sheet (5).

2. The electrode structure for electrolysis of water (1), wherein the second sheet (2) formed from an electrically non-conductive material, a plurality of holes (3) having been formed through said second sheet is an electrically non-conductive material of net shape.

3. The electrode structure for electrolysis of water (1), wherein the first sheet (4) formed from an electrically conductive material, a plurality of holes (6) having been formed through said first sheet and/or the third sheet (5) formed from an electrically conductive material, a plurality of holes (7) having been formed through said third sheet are an electrically non-conductive material of net shape.

4. A method for sterilization of water by the electrolysis of water comprising:

a part or whole part of the electrode structure for electrolysis of water (1) of claims 1, 2 or 3 is immersed into water;

an electric voltage is applied across the sheet (4) formed from an electrically conductive material and the sheet (5) formed from an electrically conductive material by setting one said sheet as an anode and another sheet as a cathode, or switching over mutually from an anode to a cathode.

\* \* \* \* \*